US006154690A

United States Patent [19]

Coleman

[11] Patent Number: 6,154,690

[45] Date of Patent: Nov. 28, 2000

[54] MULTI-FEATURE AUTOMATED WHEELCHAIR

[76] Inventor: Raquel Coleman, 14355 SW. 92 Ter., Miami, Fla. 33186

[21] Appl. No.: 09/414,954

[22] Filed: Oct. 8, 1999

[51] Int. Cl.[7] .......... G06F 7/00

[52] U.S. Cl. .......... 701/1; 701/1; 701/29; 180/65; 280/250.1

[58] Field of Search .......... 701/1, 29; 280/250.1; 180/65.5, 65

[56] References Cited

U.S. PATENT DOCUMENTS

| | | | |
|---|---|---|---|
| 3,282,605 | 11/1966 | Nihlean et al. | 280/211 |
| 3,764,180 | 10/1973 | Mulholland | 297/400 |
| 3,881,773 | 5/1975 | Rodaway | 297/377 |
| 4,125,269 | 11/1978 | Kiel | 280/30 |
| 4,132,228 | 1/1979 | Green | 128/33 |
| 4,190,263 | 2/1980 | Powers | 280/242 |
| 4,617,919 | 10/1986 | Suhre | 128/78 |
| 4,691,962 | 9/1987 | Holdt | 297/84 |
| 4,837,873 | 6/1989 | DiMatteo | 5/81 R |
| 4,925,242 | 5/1990 | Harris et al. | 297/284 |
| 4,934,725 | 6/1990 | Owens | 280/304.1 |
| 4,948,156 | 8/1990 | Fortner | 280/304.1 |
| 4,949,408 | 8/1990 | Trkla | 5/86 |
| 4,966,392 | 10/1990 | Featon et al. | 280/801 |
| 4,989,890 | 2/1991 | Lockard et al. | 280/42 |
| 5,033,000 | 7/1991 | Littlejohn et al. | 364/424.05 |
| 5,044,647 | 9/1991 | Patterson | 280/250.1 |
| 5,079,790 | 1/1992 | Pouch | 5/431 |
| 5,113,481 | 5/1992 | Smallwood et al. | 395/2 |
| 5,137,102 | 8/1992 | Houston, Sr. et al. | 180/65.5 |
| 5,180,181 | 1/1993 | Letechipia | 280/304.1 |
| 5,253,724 | 10/1993 | Prior | 180/65 |
| 5,263,768 | 11/1993 | Scheulderman | 297/362.13 |

(List continued on next page.)

FOREIGN PATENT DOCUMENTS

| | | |
|---|---|---|
| 163976 | 3/1955 | Australia . |
| 0312969 | 4/1989 | European Pat. Off. . |
| 640765 | 7/1950 | United Kingdom . |
| 1407033 | 9/1975 | United Kingdom . |
| 2141980 | 1/1985 | United Kingdom . |

OTHER PUBLICATIONS

Invacare Corporation, *Action Ranger X Storm Series*, 1995.

Pride Health Care Inc., *Jazzy™ Power Chairs*, 1996.

Quickie Designs Inc., *Options&Accessories Catalog*, 1996.

Sunrise Medical, *Jay Care Seating*, 1998.

Hoveround Corporation, *Hoveround® Personal Mobility Vehicles*.

*Primary Examiner*—William A. Cuchlinski, Jr.
*Assistant Examiner*—Tuan To
*Attorney, Agent, or Firm*—Richard C. Litman

[57] ABSTRACT

A multi-feature automated wheelchair and method provides a significant degree of mobility for the mobility impaired, with minimum human intervention. The wheelchair is constructed to provide a therapeutic effect and is calibrated to accommodate at least three seating configurations for a specific user. The wheelchair is motor driven via a control assembly for activating and controlling wheel rotation. The control assembly includes a joy stick controller for controlling both the speed and direction of motion of the wheelchair, respectively. At least one actuator is used for activating a seat, back, head, at least one leg and at least one arm rest as independent moveable elements. Three separate controllers are optionally used for transmitting emergency data, activating an alarm system, and adjusting the relative heights of the seat, back and head rest portions of the wheelchair. A lap-top computer or optional keyboard is operatively connected and mounted to the wheelchair for inputing control and user data therein. A control switch is mounted within the base of the joy stick controller for activating an auxiliary alarm indicator peripherally mounted within the neck rest visibly indicates a user distress signal. The computer is configured to activate condition related signals per user via a combination audible and visual alarm signal. The neck rest is removably secured to the back rest and made to accommodate a specific neck condition.

16 Claims, 6 Drawing Sheets

U.S. PATENT DOCUMENTS

| | | | |
|---|---|---|---|
| 5,361,437 | 11/1994 | Zhu et al. | 5/639 |
| 5,363,934 | 11/1994 | Edmund et al. | 180/6.5 |
| 5,378,041 | 1/1995 | Lee | 297/391 |
| 5,555,949 | 9/1996 | Stallard et al. | 180/6.5 |
| 5,718,442 | 2/1998 | Alexander et al. | 280/250.1 |
| 5,743,545 | 4/1998 | Kunze et al. | 280/250.1 |
| 5,961,561 | 10/1999 | Wakefield, II | 701/29 |
| 5,996,716 | 12/1999 | Montiglio | 180/65.5 |
| 6,003,627 | 12/1999 | Ishida | 180/206 |

MULTI-FEATURE AUTOMATED WHEELCHAIR

BACKGROUND OF THE INVENTION

1. Field of the Invention

The present invention relates generally to wheelchairs, and, more specifically, to an automated multi-feature calibration method and wheelchair for the mobility impaired.

2. Description of the Related Art

Numerous wheelchairs have been devised having special features for accommodating the basic physical needs of the mobility impaired. However, the use of conventional wheelchairs has served primarily as transportation vehicles which require significant human assistance. While such use of the conventional wheel chairs is well known for accommodating the basic transportation need of the mobility impaired, an multi-feature automated wheelchair and method which maximizes the degree of mobility with virtually no need for human intervention as described herein is lacking.

For example, U.S. Pat. No. 3,282,605, issued to Russell E. Nihlean et al. on Nov. 1, 1966, describes an adjustable foot and leg rest for a wheelchair. The legs telescope to adjust for length, and are held at a desired length by a pin. The angle is adjusted by a hand crank operating a pinion, which moves a rack attached to the leg rest. Pulling the hand crank outward locks the pinion into meshing teeth to hold the leg rest in place.

U.S. Pat. No. 3,764,180, issued to Lawrence K. Mulholland on Oct. 9, 1973, describes a neck rest and shoulder support structure. The structure includes a U-shaped pad for cradling the back and sides of the neck, and a pair of shoulder pads extending downward and inward across a patient's lower neck and upper chest.

U.S. Pat. No. 3,881,773, issued to Keith S. Rodaway on May 6, 1975, describes a reclining back wheelchair. The wheelchair back includes adjustment tubes pivotally connected to the back of the chair, and slidably connected within guide cylinders. The guide cylinders are pivotally attached to the wheelchair frame. A pawl locks the tube and guide cylinder together in the proper position.

U.S. Pat. No. 4,125,269, issued to Louise A. Kiel on Nov. 14, 1978, describes a recliner-rocker geriatric wheelchair. The wheelchair includes a leg board which retracts into the seat, and a reclining back rest. The wheelchair has a unitary member moving between a first position wherein it allows the wheelchair to roll, but prevents rocking, and a second position wherein it permits rocking, but prevents rolling.

U.S. Pat. No. 4,132,228, issued to James A. Green on Jan. 2, 1979, describes a support seat cushion assembly. The seat is intended to evenly distribute pressure across the gluteal region. A hole is cut in the support cushion to relieve pressure for the ischial tuberosities. A foam insert relieves pressure around the coccyx. The cushion has a support layer of firm, resilient foam, a comfort layer of medium resilient foam, and a pressure distribution layer of soft foam with an elongated hole in the central portion.

U.S. Pat. No. 4,190,263, issued to Samuel T. Powers on Feb. 26, 1980, describes a shock absorber for a wheelchair. The shock absorber has a lever, with one end mounting to the standard wheel mounting location on the wheelchair, the center mounting to the wheel's axle, and the opposite end having a downward depending spring. The opposite end of the spring is attached to a rigid portion of the wheelchair.

U.S. Pat. No. 4,617,919, issued to Robert B. Suhre on Oct. 21, 1986, describes a wheelchair with posture supports. A U-shaped neck support and padded, spring biased shoulder support bars provide support for the neck and shoulders. A V-shaped crotch support supports the thighs from the front of the chair, and a pair of hip supports extend inward from each side of the chair. The back of the chair is adjustable relative to the seat, and the back and side assemblies are removable.

U.S. Pat. No. 4,691,962, issued to Donald H. Holdt on Sep. 8, 1987, describes a convertible wheelchair/litter. The back rest and foot rest move from their vertical to their horizontal positions simultaneously. The cushions and upholstery are easily detachable for cleaning.

U.S. Pat. No. 4,837,873, issued to Paul DiMatteo on Jun. 13, 1989, describes a reclining wheelchair. The wheelchair is used in combination with a bed to transfer a patient from one to the other. The height of the bed adjusts to the height of the wheelchair. The back rest reclines, and the foot rest raises. The bed, seat, backrest, and footrest all include sheets wrapped around rollers on either side, forming a motor-powered conveyor belt, used to transfer a patient from the bed to the wheelchair and vice-versa. The sheets forming the seat include an opening to allow use of a toilet while seated in the wheelchair.

U.S. Pat. No. 4,925,242, issued to Godfrey Harris et al. on May 15, 1990, describes an adjustable lumbar back support for a wheelchair. The lumbar support includes a crossbar passing horizontally across the rear of the back support, and a pair Of back support members on the crossbar. The crossbar may be moved forward or backward as desired.

U.S. Pat. No. 4,934,725, issued to Jesse Owens Jun. 19, 1990, describes a portable standing attachment for wheelchairs. The standing attachment has a rectangular front frame portion pivotally attached to the lower portion of the wheelchair. A stabilizer extends downward from a lower portion of the front member to the ground. A pair of elongated side members extend from the upper end of the front member to the top of the back rest. The armrests convert to knee supports. The standing attachment can be moved from its storage position on the wheelchair to the standing position by the wheelchair user in about one minute.

U.S. Pat. No. 4,948,156, issued to Glenn D. Fortner on Aug. 14, 1990, describes a standing lift and support for wheelchair users. A framework attaches to the front of the wheelchair. The framework includes a harness attaching to the hips of the wheelchair user, and a manually operated worm gear mechanism connected by a cord to the harness. The worm gear mechanism is used by the wheelchair user to pull himself into a standing position. Knee braces and foot straps assist the user in standing.

U.S. Pat. No. 4,949,408, issued to Theodore A. Trkla on Aug. 21, 1990, describes a self-powered wheelchair. The wheelchair includes a seat with a bedpan, a pivoting leg rest, a pivoting back rest, and pivoting, retractable arm rests. The wheelchair may convert to a bed, and is vertically adjustable to position the wheelchair at the same height as a bed. The wheelchair includes a motor for driving the rear wheels, and a controller which may be positioned on an armrest or on the backrest. Motion of the wheelchair is controlled by a joy stick, and the backrest, leg rest, and height are controlled by switches. The front of the wheelchair has a U-shaped exercise bar with a trapeze bar suspended from its top to allow the user to pull himself up. The exercise bar also includes hand exercisers having handgrips attached to coil springs.

U.S. Pat. No. 4,966,392, issued to Robert J. Featon et al. on Oct. 30, 1990, describes a wheelchair having occupant restraints for protecting the occupant from deceleration forces. A lap belt secures the occupant in the chair, and straps extending from the wheelchair to the floor of a vehicle secure the wheelchair in place in a vehicle.

U.S. Pat. No. 4,989,890, issued to Walter G. Lockard et al. on Feb. 5, 1991, describes a length and width adjustable wheelchair. The wheelchair has right and left side frames, connected by telescoping cross members forming an X shape and pivotally connected at their center. The back is vertically adjustable, and the foot rests are adjustable in height.

U.S. Pat. No. 5,079,790, issued to William H. Pouch on Jan. 14, 1992, describes a foam cushion for use with a wheelchair. The cushion has a plurality of individual foam springs supported on a base, forming a downward incline towards the rear of the wheelchair. A pressure relief cut out in the bottom of the cushion relieves pressure around the bony areas of the buttocks.

U.S. Pat. No. 5,180,181, issued to Jorge Letechipia on Jan. 19, 1993, describes a motorized movable storage bag for use on a wheelchair. The bag is mounted on an L-shaped bar which pivots from a position adjacent the backrest to a position adjacent an armrest.

U.S. Pat. No. 5,263,768, issued to Petrus J. Scheulderman on Nov. 23, 1993, describes a wheelchair with an adjustable backrest. The backrest is supported by telescoping tubes containing gas springs. U.S. Pat. No. 5,361,437, issued to Li S. Zhu et al. on Nov. 8, 1994, describes a cushion having an electromagnetic hammering massage apparatus. U.S. Pat. No. 5,378,041, issued to Don W. Lee on Jan. 3, 1995, describes a wheelchair. The wheelchair includes a removable inclined back support, removable foot supports, and an outwardly extending leg support.

U.S. Pat. No. 5,743,545, issued to Karl-Heinz Kunze et al. on Apr. 28, 1998, describes a wheelchair with an adjustable frame. Each side frame member can be extended longitudinally. The front guide wheels can pivot to adjust the height of the chair. The backrest can be pivoted. U.K. Pat. No. 640,765, published on Jul. 26, 1950, describes a wheelchair having a backrest, seat, and leg rests with individually adjustable angles.

Australian Pat. No. 163,976, published on Mar. 10, 1955, describes a bed which converts to a chair. The bed has a wheeled base supporting a mattress. The mattress has a seat portion in the center, a back rest portion on one end, and a foot rest portion on the other end. The back rest portion and foot rest portion are operatively connected so that raising the back rest lowers the foot rest, converting the bed to a chair.

U.K. Pat. No. 1,407,033, published on Sep. 24, 1975, describes a standing aid. The standing aid has a frame with a pivotally mounted seat. The seat moves between a sitting position and a standing position, and locks in various positions between sitting and standing. Braces support the front of the knees and back of the heels.

U.K. Pat. App. No. 2,141,980, published on Jan. 9, 1985, describes an adjustable length rear portion. The seat of the wheelchair is on the front portion. The length adjustment may be powered by a motor.

European Pat. App. No. 0,312,969, published on Apr. 26, 1989, describes a wheelchair having an adjustable width. The wheelchair has a pair of side frames with perpendicular, horizontal crossbeams. The corresponding crossbeams are linked together, positioning the side frames the correct distance apart.

None of the above inventions and patents, taken either singularly or in combination, is seen to describe the instant invention as claimed. Thus a light weight reclining wheelchair solving the aforementioned problems is desired.

SUMMARY OF THE INVENTION

The multi-feature automated wheelchair and method according to the invention provides a significant degree of freedom for the mobility impaired, with minimum to virtually no need for human intervention. The wheelchair is constructed to provide a therapeutic effect and is calibrated to accommodate at least three seating configurations for a specific user. The wheelchair is motor driven via a control assembly for activating and controlling wheel rotation. The control assembly includes a joy stick controller for controlling both the speed and direction of motion of the wheelchair, respectively. At least one actuator is used for activating a seat, back, head, at least one leg and at least one arm rest as independent moveable elements.

Three separate controllers are optionally used for transmitting emergency data, activating an alarm system, and adjusting the relative heights of the seat, back and head portion of the wheelchair. A lap-top computer or optional keyboard is operatively connected and mounted to the wheelchair for inputing control and user data therein. A control switch is mounted within the base of the joy stick controller for activating an auxiliary alarm indicator. This particular signal visibly notifies a professional care giver of user distress or a user emergency. The computer is configured to activate condition related signals per user via a combination audible and visual alarm signal. The condition response is activated either manually by a dual thumb switch mounted within the joy stick or programmed via the clock of the computer to sound at various predetermined times. User and emergency data is maintained within a memory storage facility of the computer and transmitted via a modem or cellular phone connection for contacting key or health care personnel.

Rear wheel motors and servomotors for actuating the seat portion of the wheelchair, respectively, are integrally connected to and powered by at least one power source mounted within a bottom portion of the wheel chair. Of especial importance is provision for elevating the seat through about 21", from the standard 19" height from a supporting surface (for example, the floor) to about 40", which is the height of a van or truck seat; thus the two seats are at the same level to ease transition of the patient from one to the other. This is accompished by the provision of hydraulics or telescoping lifts benneath the seat.

Special pillows for stimulating circulation via vibration or the like can be optionally inserted depending on the condition of the user. Also, the neck rest is removably secured to the back rest and made to accommodate a specific neck condition. A set of low energy lights are mounted thereon to signal distress.

Accordingly, it is a principal object of the invention to provide a multi-feature automated wheelchair for the mobility impaired which minimizes human assistance and maximizes user independence.

It is another object of the invention to provide a multi-feature wheelchair which is computer controlled for activating remote emergency assistance from at least a single contact or local a health care professional.

It is a further object of the invention to provide a multi-feature wheelchair which provides maximum mobility for a user with minimum weight requirements.

Still further, it is an object of the invention to provide a method for calibrating the wheelchair according to the invention for a specific user.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
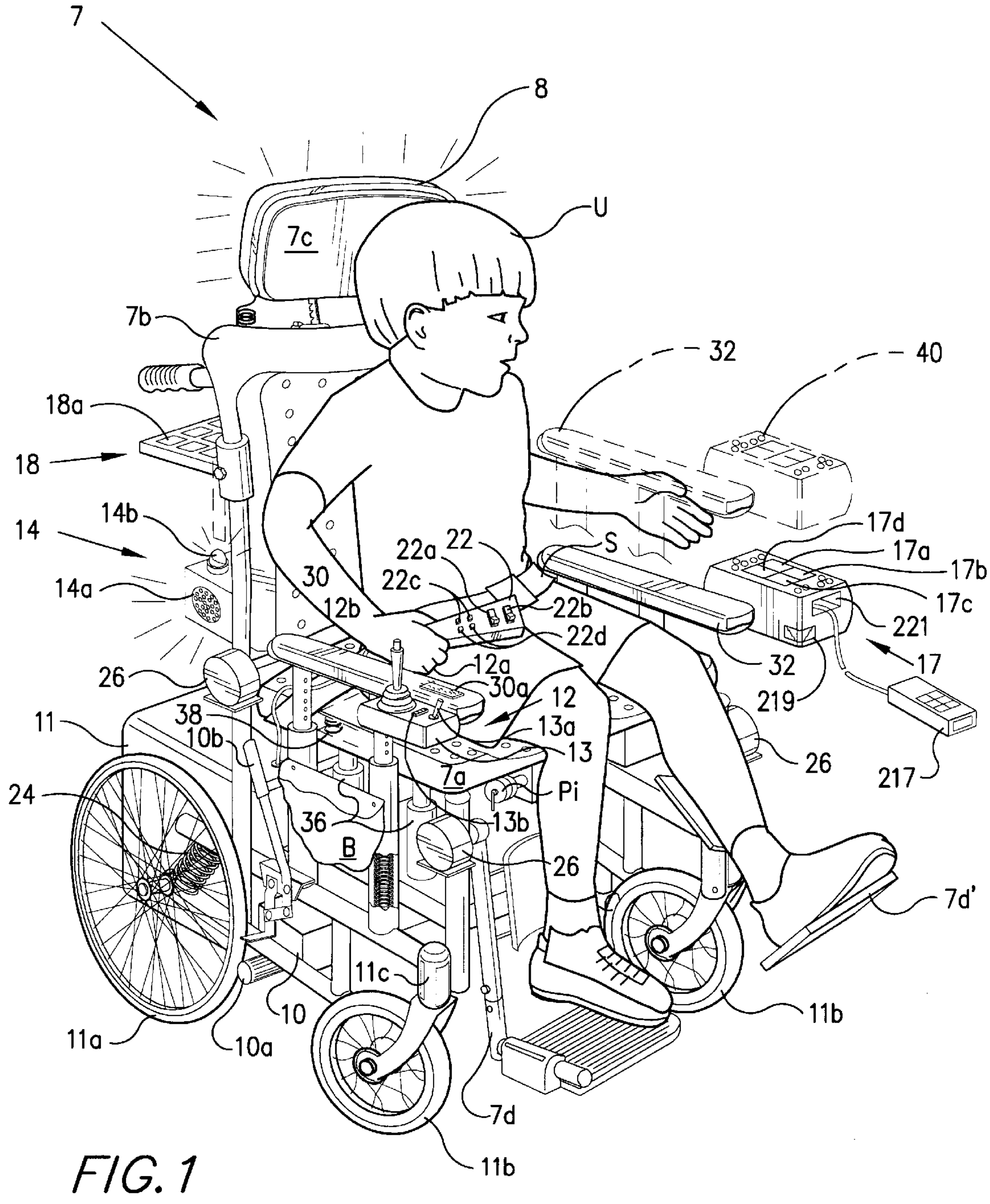
FIG. 1 is an environmental, perspective view of a multi-feature automated wheelchair according to the present invention.

The present invention is directed to a multi-feature automated wheelchair and method which maximizes independent wheelchair use for the mobility impaired. A rather small child or user U is depicted in FIGS. 1–4, simply to provide a better view of the multiple components of the invention. Clearly, the invention is intended for use by all segments of the population having such a need, especially infirm adults or the elderly.

The preferred embodiments of the present invention are depicted in FIGS. 1–6, and are generally referenced by numerals 7 and 9, respectively.

As best seen in FIGS. 1–4, the multi-feature automated wheelchair 7, according to a first embodiment, comprises the wheelchair 7 having a motor means 10 and a control assembly 12 for activating and controlling wheel rotation. The control assembly 12 includes a joy stick controller 12*a* mounted within a base 13 for controlling the speed and direction of motion of the wheelchair 7, via rear wheels 11*a* as drivers and front wheels 11*b* as direction guiders which are electrically connected by direction controllers 11*c* in a conventional way.

The controller 12*a* also includes a push button dual element activation switch 12*b* disposed within a top central or core portion of the joy stick 12*a* for activating an alarm system 14. The alarm system provides alarm signals in both audible 14*a* and visible 14*b* mediums via switch 12*b*. The visible alarm 14*b* is preferably a light, which can include any number of configurations such as a strobe or rotating light source. The alarm system is also adaptable for connection with a computer interface or means 18 as a computer controlled alarm signalling device.

The computer means 18 comprises an internal clock (not shown), an input means 18*a* such as a keyboard, a processor (not shown), a means 17 such as a modem connection for use within buildings or similar locations, and/or a cellular phone (not shown) or the like for outside emergency use.

In either case, the transmitting means 17 is configured for allocating to memory emergency contact data as preset telemetry data for contacting a remote location. The data will include emergency contact phone numbers of at least three contact persons including a health care professional P such as a paramedic, fireman, police officer (see FIG. 4), and/or a near relative R (see FIG. 3. This data is maintained within a memory storage facility of the computer 18, and is processed as user specific and operational data for the wheelchair 7. Since these computer features are conventional components of a computer, they have been diagrammatically illustrated in FIGS. 1–4 as black box hardware computer features. Accordingly, the power source for the computer can include a wide variety of battery sources currently available as either a removable rechargeable battery pack or fixed power source depending on the type of computer (i.e. lap-top, Pentium class, etc.) one skilled in the art desires to use to obtain the intended results within the scope of the instant invention. The computer or lap-top is preferably disposed and mounted to the rear of the back rest 7*b* of the wheelchair 7, and can be lowered for or after use. Any convenient support bracket mechanism can be used, so long as the device provides the intended function with reduced material requirements.

Similarly, the power source 11 for the motor means 10 and other systems is also illustrated as a black box feature which is housed and mounted directly between the rear wheels 11*a* of the wheelchair 7 for transmitting power to a wheel driver 10*a* at least, having a knurled surface which operatively engages or impresses the peripheral surface of each rear wheel 11*a*, respectively, as a frictional driving interface. The power source and gear mechanisms which subsequently drive each rear wheel 11*a* are well known to one having ordinary skill in the relevant art, and have been illustrated as black box features as well. Rechargeable batteries as well as a chair mounted battery charger are included in this area as well. While a variety of motor systems are available to is one having ordinary skill in the art for providing a similar function, the driving features described herein have been selected to reduce overall weight requirements of the wheelchair 7. Thus, any motor means can be used so long as it is used in accordance with scope and intent of the instant invention as herein described.

As diagrammatically illustrated in FIG. 1, a mobility impaired user U utilizes at least one activation means 22 for activating a seat 7*a*, back 7*b*, head 7*c*, at least one leg 7*d*, and at least one Of the arm rests 30, 32, as independent moveable elements on the wheelchair 7. It is also noted here that a seatbelt S is provided both for user safety and comfort, especially as one or more of the movable components of the invention are adjusted to position to suit the user. The activation means 22 is preferably a hand held controller which is operatively connected to and powered by the power source 11 as a rechargeable power source. The hand held controller 22 comprises three distinct control switches 22*a*, 22*b*, 22*c* and 22*d* for respectively controlling calibrated positions of the seat 7*a*, back 7*b*, and right 7*d* and left 7*d*' or first and second leg rests as independent moveable elements. Position controlled servo motors 26 are mounted to the frame F and are respectively hindgedly or rotatably connected to the back 7*b* and leg rests 7*d*, 7*d*' for operatively displacing the respective elements within a predetermined calibrated angular range, according to certain power input requirements. The power source 11 can include a number of batteries as coupled or uncoupled modular power sources for providing power to the respective controllers for effective wheelchair 7 operation. This arrangement has the advantage of providing connectivity panels for the power source which are formed on the outside of a housing or optionally allowing for quick and easy removal of the respective battery via a simple modular connection. These types of connections are well known and currently available to the skilled artisan for recharging the respective source via a connection with an alternating power source (i.e. 120 VAC).

The head rest 7*c* is an insertable rest element which is inserted and adjustably mounted within two apertures for accommodating the adjustable head rest 7*c*. Head rest 7*c* is adjustable vertically to at least four positions. The head rest 7*c* also includes a low energy light source 8 disposed along a peripheral surface of the neck rest 7*c*, and it is electrically connected to the wheelchair 7 for indicating a visible auxiliary distress signal. An on/off switch 13*a* is disposed within the base 13 of the joy stick controller 12*a* for activating light source 8. The light source 8 comprises at least two different low energy lights formed as an single integrated structure. Also, a battery power indicator 13*b* is conveniently provided on base 30, for monitoring by the user; a separate battery power indicator may be provided at the upper rear of the wheelchair 7 (not shown) for monitoring by an attendant.

All of the wiring for each controller and respective device is insulated from exterior conductive elements and is channeled through the frame of the wheelchair 7 to its respective source for receiving power. Such electrical connections are well known to one having ordinary skill in the art, and have not been shown as a matter of illustration clarity. However, where appropriate, such connections have been shown for proper enablement.

A mechanical brake 10*b* is operatively mounted to the frame of the wheelchair 7, within the reach of a user U for selectively stabilizing the wheelchair 7. Shock absorbing springs 24 having a predetermined spring constant k (N/m) are also mounted and connected between the frame and rear wheels 11*a* to reduce or absorb an inordinate amount of shock. This particular arrangement has been used in lieu of the more elaborate shock absorbing systems because of minimal weight considerations.

The arm rests 30 and 32 are spring loaded position controlled mechanisms which are adjustable for at least three distinct heights by a user U, by selectively applying a downward, albeit minimal, force on either arm rest to disengage the respective arm rest 30,32 for spring activated height adjustments in the direction opposite the applied force by the user U. Alternatively, it may be desired that the armchair adjustments be electricallly and/or hydraulically controlled from a suitable actuator, and such is obviously possible, and entirely within the scope of this invention.

A hook and loop fastener 30*a* (See FIG. 2) is mounted to one of the arm rests 30,32, in a user-comfort position at the forward end of the armrest 30, and on an underside portion (not shown) of the hand held controller 22, for mounting when not held or handled by the user U. Apertures can be made within the supporting arm structure of the respective arm rest mechanism to further reduce the overall weight of the wheelchair 7. Similar apertures can be made within the frame supports which insertably house the arm rest supports and the position controlled spring assembly to form mating apertures for optionally mechanically securing the arm rest at a discrete height adjustment level. This modification will allow for further overall weight reduction and/or including other mechanical couplings such as cotter pins or the like for additional adjustments of the respective arm rests 30,32.

Figure 2:
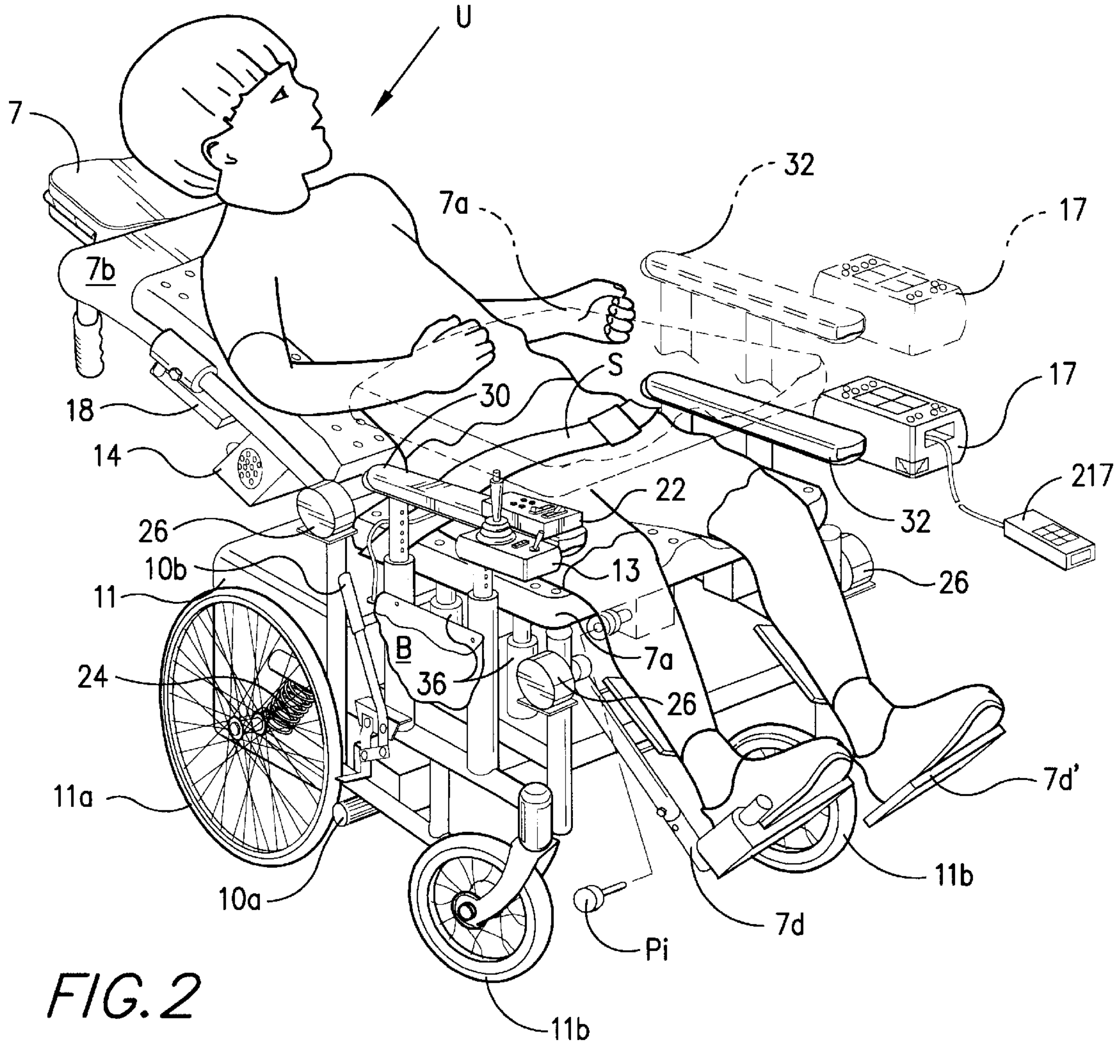
FIG. 2 is a perspective view of the multi-feature automated wheelchair according to the invention, illustrating the wheelchair in a reclined configuration.

The back rest 7*b* has an ergonomic design which is shaped to provide a therapeutic effect. Other stimulating mechanisms such as heating coils and the like can be incorporated as a customized feature depending on the personal preference of the user U. The back portion is calibrated via computer to provide controlled back rest adjustments of at least three distinct positions, notably a laying, seating and intermediate position therebetween via the position controlled servo-motor 26. For continuous operating control the back rest 7*b* is activated via the hand held controller 22*b*. Preset back rest 7*b* configurations can also be defined by a health care professional based on the condition of a user U requiring therapy or the like in nursing homes, hospitals, etc. For example, FIG. 2 diagrammatically illustrates the wheelchair 7 calibrated for a laying configuration at an intermediate position between the sitting configuration illustrated in FIG. 1 and a complete laying or horizontal position or configuration. It can be appreciated from FIGS. 1, 2 that the design of the invention is such that virtually a complete horizontal disposition of seat, back and leg rests is contemplated. The position of the back rest 7*b* is controlled by inputing an angular displacement value e ranging preferably between 0 and 100°. A single servo-motor is configured to control the rotation of the back rest 7*b* as a rigid rotating attachment. Servo-motors are simple to use and calibrate and have the advantage of requiring low power input for effective use. In addition, the electrical wiring required to operatively connect and configured the motor for computer control is minimal compared to more elaborate and bulky systems. Power and weight requirements of each servo-motor are determined based on required loading and extent of use to prevent cyclical fatigue and similar mechanical breakdowns.

Likewise, each respective leg rest 7*d*,7*d*' is similarly calibrated and controlled via preset computer controlled input data or manually via the controller 22*c* and 22*d*, respectively. Each leg rest controller 22*c*, 22*d* has a top button for raising the respective leg rest and a bottom button for respectively lowering each leg rest 7*d*, 7*d*'. If desired, additional motors and controls may be provided for folding each footrest up and down (not shown). The controlling means by which each leg rest 7*d* and 7*d*' is lowered and raised can include any number switches to provide a toggling or continuous motion accordingly. However, it has been found that separate switches prevents unwanted jerking or the like between lowering and raising intervals. In addition, the servo-motors are preferably pre-calibrated at to prevent overshoot which contributes to "jerk" phenomena.

Figure 3:
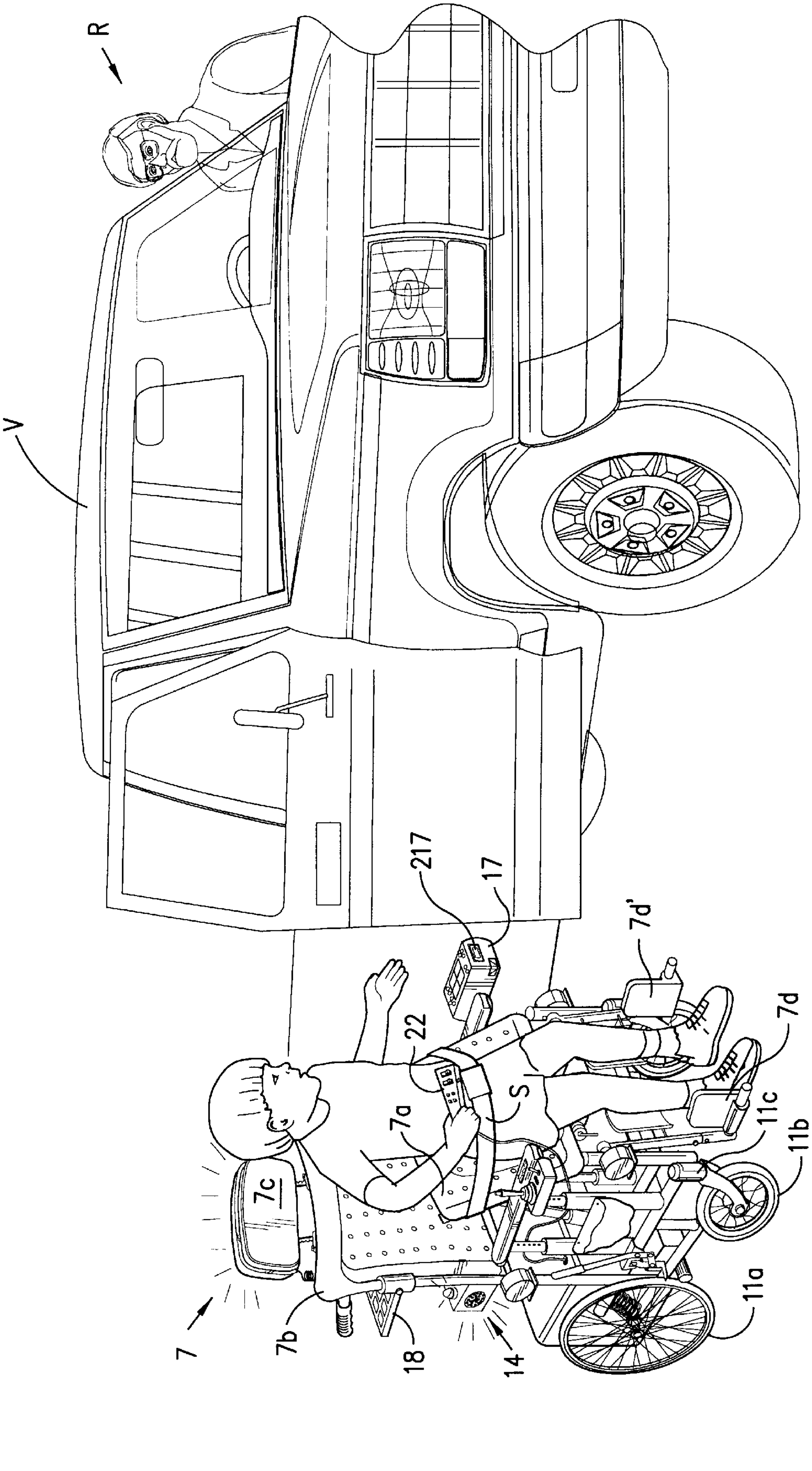
FIG. 3 is a perspective view of the multi-feature automated wheelchair according to the invention, illustrating a pivotal seat segment for providing a standing configuration.
Figure 4:
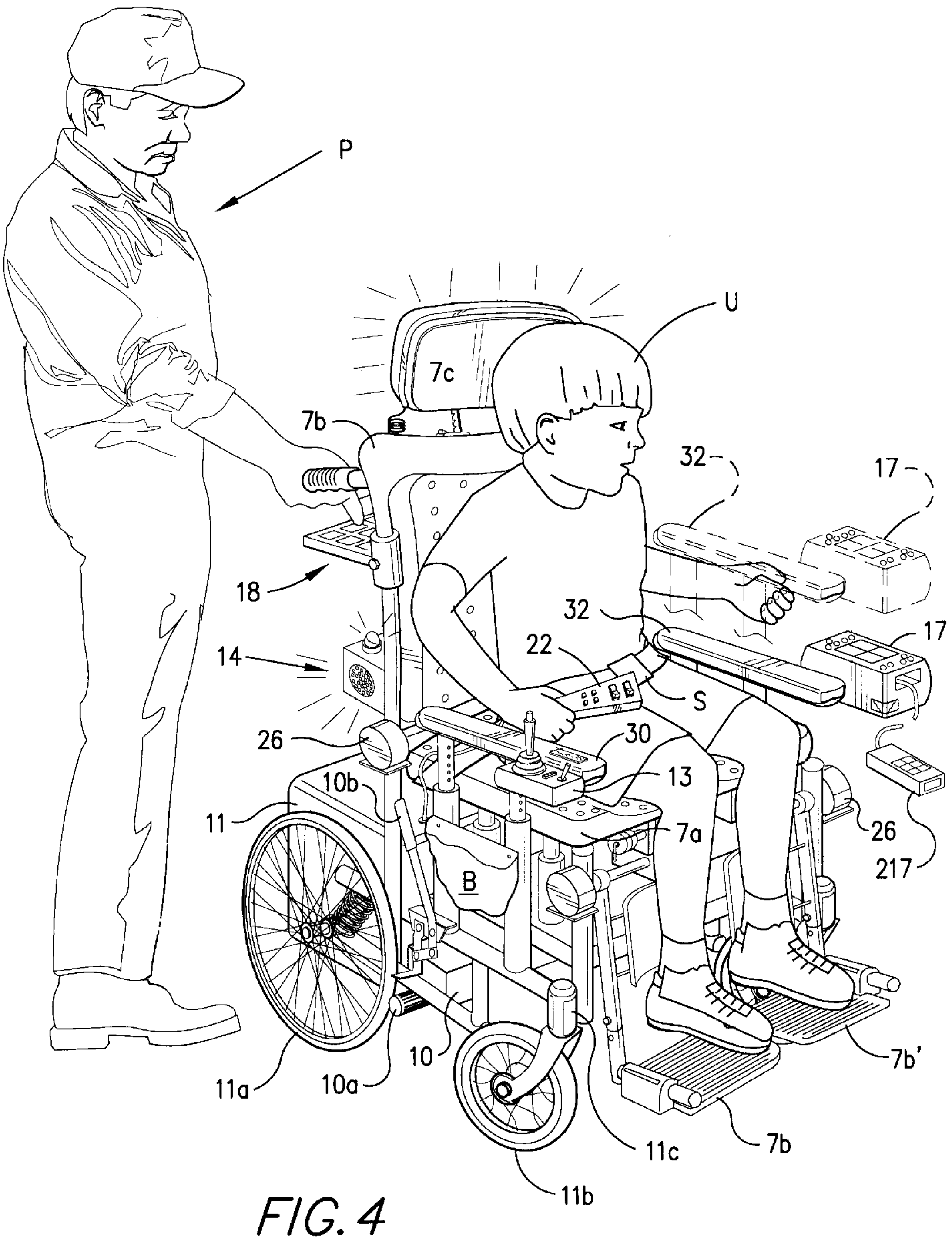
FIG. 4 is a perspective view of the multi-feature automated wheelchair according to the invention, illustrating computer controlled manipulation via a health care professional.

As diagrammatically illustrated in FIG. 3, the wheelchair 7 is shown wherein a user U is supported for a standing position for entering vehicles V or for simple stretching. Accordingly, the seat rest 7*a* is similarly constructed having an ergonomic design to provide therapeutic and lower lumbar support. Here, the safety provided by the seat belt S can be fully appreciated. In addition to the single lap belt shown, additional belts at lap and mid-calf (not shown) can be provided for further security and safety as the user is lifted from a seated position to a standing position illustrated. Stimulation mechanisms can be included such as insertable pillows which provide vibratory stimulation to improve circulation or alternatively pillows which provide heat stimulation to do the same. Such features can be configured as a custom feature depending on the personal preference of the user U. As shown in FIGS. 2 and 3. The seat rest 7*a* is pivotally attached to the front of the chair just above the leg rests 7*d*,7*d'* therebetween. Simple hydraulic actuators 36 are substantially centrally disposed and mechanically secured an underside portion of the seat rest 7*a*.

The actuators 36 are mounted and operatively connected to provide control actuated lifting capacity, preferably around 275 lbs. The seat rest 7*a* also comprises a number of spring elements 38 which provide a certain degree of sitting comfort and for reducing shock during and after lifting. Similarly, the hydraulic actuators 36 are electrically configured and calibrated to provide at least three distinct height adjustments depending on the unique physical characteristics of the user such torso size, leg length, weight, etc. Such use of hydraulic mechanisms are known and would require only routine skill in the art to configure. Thus, the lifting mechanism details have not been shown and are considered as black box features for obtaining the intended results as herein disclosed. Accordingly, the hand controller switch 22*a* is electrically configured and calibrated for manual and computer controlled activation of the seat rest 7*a* at predetermined levels, in the form of a angular or linear displacement value $\theta_j$ or $x_j$, where j=1, 2, 3, . . . for discrete incremental height adjustments, respectively. Such adjustments are provided as standard calibrating features for the seat 7*a*, back 7*b*, and leg rest 7*d*,7*d'*, respectively. As diagrammatically illustrated in FIG. 4, there is shown a health care professional P activating the computer interface 18 for a selective calibrated mode or manual operating mode for a specific user. The calibration method is further described in FIGS. 5 and 6 according to the second embodiment of the invention 9.

In the event of an emergency, FIGS. 1–4, schematically illustrates a transmitting means 17 comprising a plurality of emergency activation buttons 17*a*, 17*b*, 17*c*, and 17*d* as presets for notifying a respective health care station, police station, fire station and/or a personal friend or relative. Each respective preset is electrically configured and adapted to the computer interface via a modem or cellular phone connection (not shown) for transmitting telemetry data. Depending on the location of the wheelchair 7 and the condition of the user therein, the user has combination of features to initiate local and distant support. Each respective emergency preset will initiate a call for help from remote human assistance. Alternatively, on board alarm signals can be activated for local assistance thereby the user U is never without a means of support in the event such is necessary. Other special features of the transmitter 17 include braille 40 and/or pictorial indicia disposed on distinct and separate surfaces adjacent to at least one of the plurality of emergency buttons 17*a*, 17*b*, 17*c*, and 17*d* for indicating at least one emergency contact for a user U. If desired, a remote 217 having all the features of transmitter 17 may be provided, and string-tethered as shown, so that if dropped, it may be easily recovered. Or, a reel and motor (not shown) may be provided inside a remote storage slot 221 for the remote, and can be button-controlled to pay out and reel in the tether string as desired. A conventional infrared sensor for the remote may be located at 219 as shown. Alternatively, an RF remote could be employed.

There are additional comfort and utility features contemplated as part of the instant invewntion as follows. A small container or bag B may be provided for storage of any desired item(s) or trash; an additional bag could be provided on the other side of the wheelchair. A pin Pi is removed to release the seat, for replacement, cleaning, etc. A removable, full length pad can be added in the winter months to cover the ventilation holes and thus provide additional comfort for the user.

Figure 5:
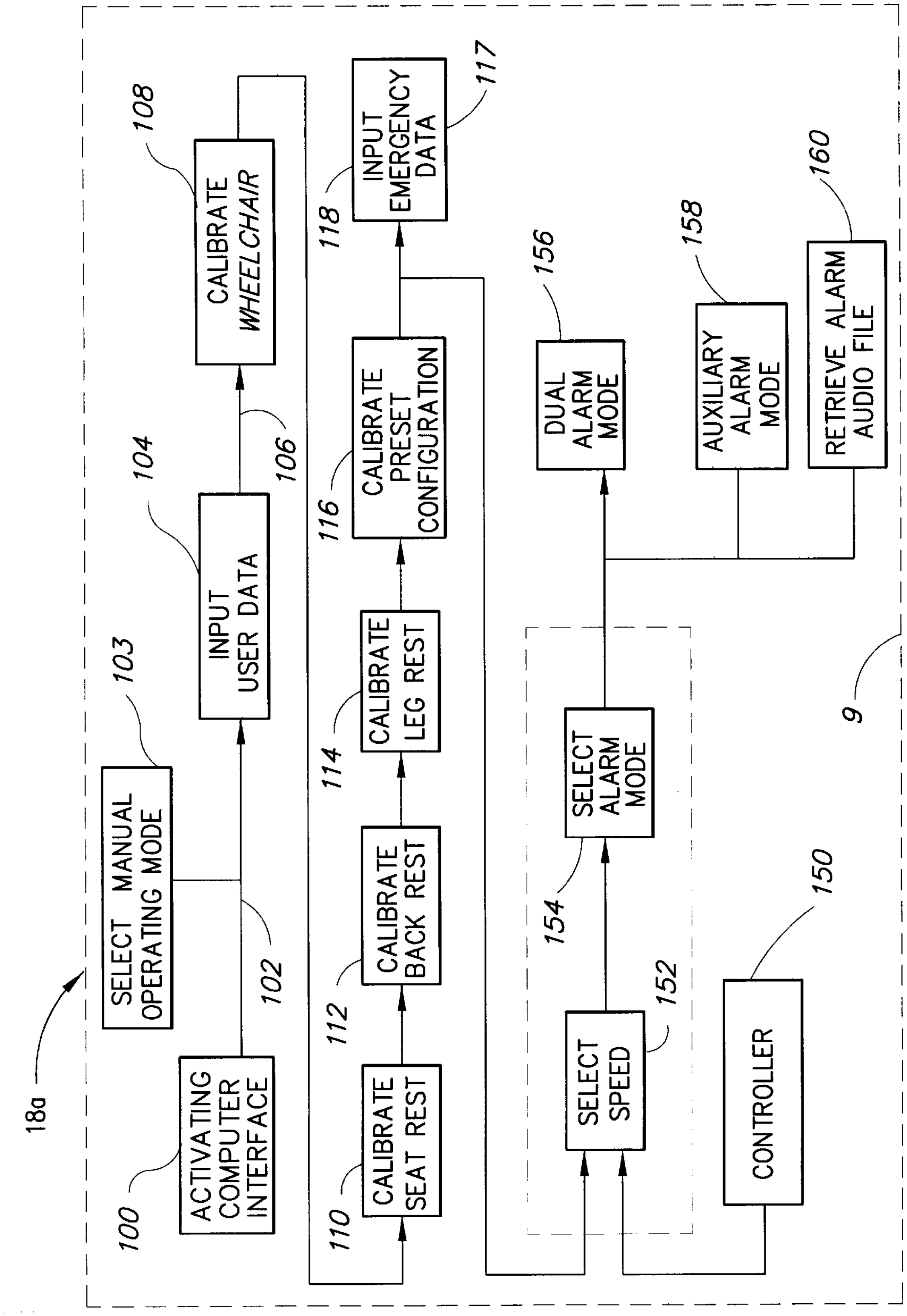
FIG. 5 is a block diagram for calibrating the multi-feature wheelchair according to the invention.
Figure 6:
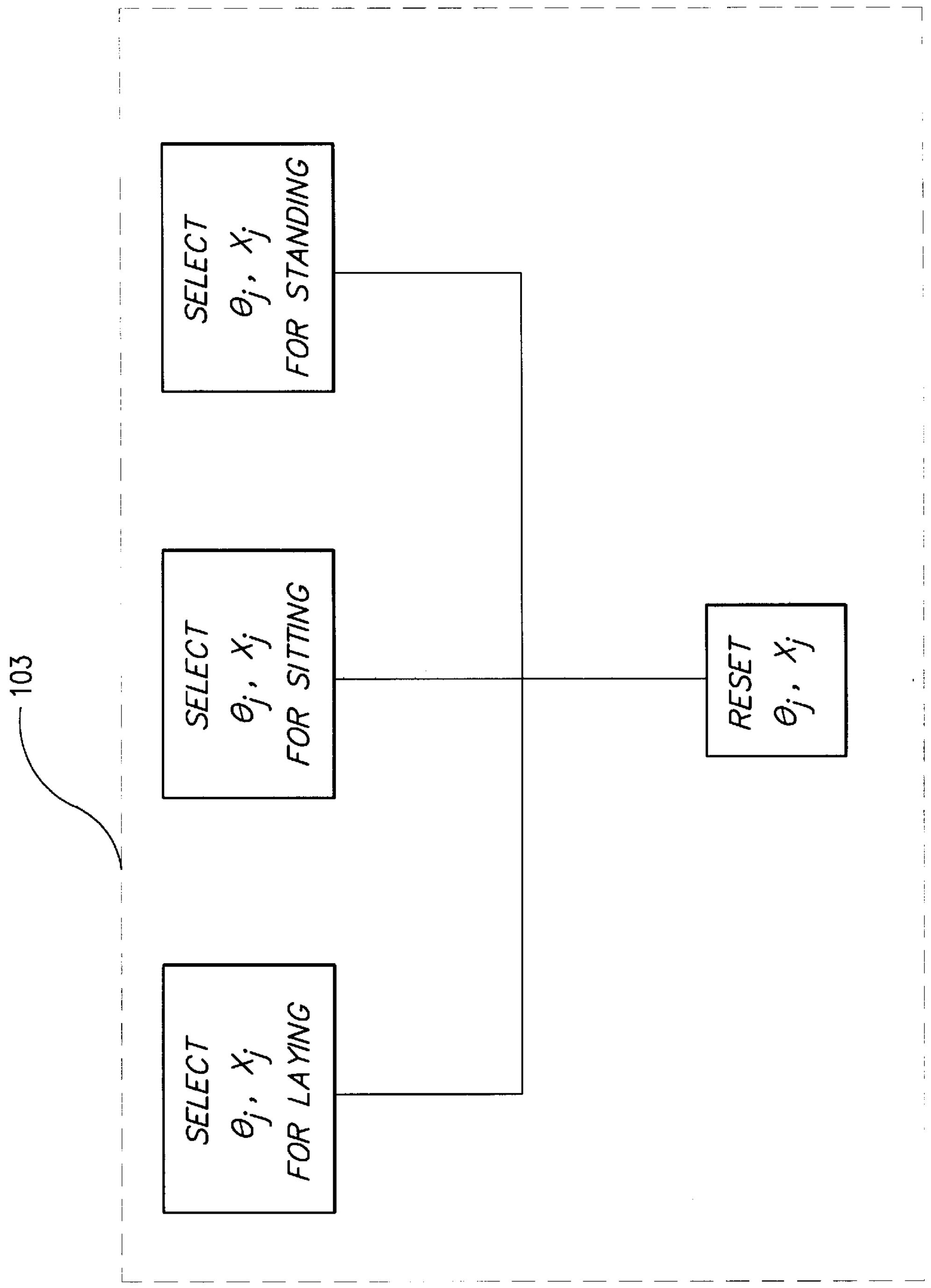
FIG. 6. is a block diagram for calibrating multiple seating configurations according to the present invention.

As diagrammatically illustrated in FIGS. 5 and 6, the invention according to a second embodiment 9 is described as a method for calibrating the multi-feature automated wheelchair for a specific user comprising the general steps of:

(a) activating 100 a computer interface for the automated wheelchair, (b) inputing 104 user specific data, such as a users name, identification number, insurance data, etc., (c) calibrating 108 the position of at least one of a seat, back, and leg rest according to at least three predetermined positions, the positions include an angular $\theta_j$ and linear displacement $x_j$ value within a predetermined range.

(1) the calibrating step (c) further comprises the step of calibrating at least one of a seat 110, back 112 and leg 114 rest to provide a laying, sitting and standing calibrated position per user.

(2) the calibrating step (c) further comprises the step of calibrating said at least one of a seat, back and leg rest to define a preset position 116 for a user.

(d) inputing 118 emergency data, (e) selecting a speed value 152 from a predetermined speed range including the step 150 of selecting a control voltage and volume value from a predetermined range, (f) selecting 154 an alarm signalling mode, (1) the alarm selecting step (f) wherein the signalling mode includes the step of selecting at least two alarm signals 156 comprising an audible and visible alarm signal.

(2) the alarm selecting step (f) wherein the signalling mode includes selecting an auxiliary alarm 158 indicator, wherein the indicator is a visible signal selected from a from a plurality of light indicating source colors.

(3) the alarm selecting step (f), further comprising the step of retrieving a user specific audio file 160 in case of a specific emergency.

(g) selecting a manual operating mode 103, said mode includes the step of deactivating and disengaging a wheel motor means for free wheel rotation, and including the step of selecting a manual operating mode for a specific wheelchair configuration, said configuration includes at least, (h) a distinct laying, (i) sitting, and (j) standing configuration, wherein each of said configuration steps (h), (i) and (j) includes the step of inputing calibrated data, corresponding to distinct linear and angular displacement values for each respective configuration within a predetermined data range.

(k) selectively engaging a brake for preventing wheel rotation, and (l) selectively disengaging a break for enabling wheel rotation.

The method for calibrating the multi-feature automated wheelchair for a specific user according second embodiment 9, wherein step (b) for inputing user specific data 104 recited above includes at least the input of a name, identification number, insurance carrier and, medical condition of the user. Also, the step (d) for inputing emergency data 118 above includes the step of inputing a telephone contact number for contacting at least one of a health care professional, ambulatory station or police station in real time or via a pre-recorded emergency message, the step (d) further including in alternative data override step for operating the wheelchair without user input data.

As shown and disclosed herein the multi-feature automated wheelchair and method provides maximum mobility for the user U with virtually no need for human intervention. This level of freedom serves to instill confidence and to rebuild a maximum level of self sufficiency in the mobility impaired. Calibrated angular and linear displacement data ranges will vary depending on the intended purpose of one having ordinary skill in the relevant art.

It is to be understood that the present invention is not limited to the embodiments described above, but encompasses any and all embodiments within the scope of the following claims.

I claim:

1. A multi-feature automated wheelchair comprising:

a wheelchair having a frame, front and rear wheels, a motor means and control assembly for activating and controlling wheel rotation, the control assembly includes a lever controller for controlling the speed and direction of motion of the wheelchair;

at least one activation means for activating a seat rest, back, head, at least one leg and at least one arm rest as independent moveable elements on the wheelchair;

a suspension system for dampening shock induced vibrations throughout the wheelchair, said suspension system including at least one spring element interconnected to the seat rest, and at least one spring damper connected between the frame and one of the rear wheels; and at least one control means for transmitting emergency data and activating an alarm, the at least one control means is electrically connected to at least one alarm indicator and a computer means for storing and activating user specific data, the at least one alarm indicator is electrically configured to and controlled by a single switch and a clock means;

the computer means comprising the clock means, an input means, a processor, a memory storage facility having data capacity for storing user specific and operational data for the wheelchair, a power source, and a means for transmitting telemetry data to a remote location;

the at least one activation means changes a relative position of at least one of said seat, back and leg rests according to at least three predetermined positions, and wherein at least one of said positions includes a position where each of said seat, back and leg rest is disposed substantially parallel and in co-planar and adjacent arrangement, the wheelchair further comprising at least one braking means for selectively preventing wheel rotation.

2. The multi-feature automated wheel-chair according to claim 1, wherein said lever controller further comprises a dual switch for controlling the at least one alarm indicator.

3. The multi-feature automated wheel-chair according to claim 1, wherein said at least one control means is a switch control means having a plurality of switches disposed within a panel, at least one of said plurality of switches is connected to the telemetry means for transmitting an emergency contact signal to a remote location.

4. The multi-feature automated wheel-chair according to claim 3, wherein said panel is removably mounted to a portion of at least one of said at least one arm rests as a stationary and remote control device.

5. The multi-feature automated wheel-chair according to claim 3, wherein the panel includes braille and pictorial indicia disposed adjacent a corresponding one of said plurality of switches.

6. The multi-feature automated wheel-chair according to claim 5, wherein the plurality of switches are button switches.

7. The multi-feature automated wheel-chair according to claim 1, wherein said activation means is a position controlled servo-mechanism for controlling a calibrated relative position of at least one of the respective rest elements, said mechanism further comprises a switch control module for operatively controlling the at least one of the respective rest elements.

8. The multi-feature automated wheel-chair according to claim 7, wherein said at least one respective rest element has an ergonomic structural design for simulating a therapeutic effect, the seat rest further comprising a mechanism for lifting and tilting the seat to support a standing position.

9. The multi-feature automated wheelchair according to claim 1, further comprises at least one mounting means for removably mounting at least one element from the group comprising a motor means, power supply, computer means, and at least one alarm indicator.

10. The multi-feature automated wheelchair according to claim 9, wherein said at least one mounting means for removably mounting at least one alarm indicator is centrally and releasably disposed on a rear portion of the back rest, said at least one alarm indicator is a combination audio and visible alarm indicator.

11. The multi-feature automated wheelchair according to claim 10, wherein said combination indicator is electrically connected to the computer means and is time controlled for indicating an alarm signal for and during a predetermined time.

12. The multi-feature automated wheelchair according to claim 1, wherein said at least one arm rest includes a means for said at least one arm rest up and down at least three discrete heights.

13. A method for calibrating the multi-feature automated wheelchair for a specific user comprising the steps of:

(a) activating a computer interface for the automated wheelchair;

(b) inputing user specific data;

(c) calibrating the position of at least one of a seat, back, and leg rest according to at least three predetermined positions, said positions include an angular and linear displacement value within a predetermined range;

(1) said calibrating step (c) further comprises the step of calibrating said at least one of a seat, back and leg rest to provide a laying, sitting and standing calibrated position per user;

(2) said calibrating step (c) further comprises the step of calibrating said at least one of a seat, back and leg rest to define a preset position for a user;

(d) inputing emergency data;

(e) selecting a speed value from a predetermined speed range, and a volume value from a predetermined volume range; and (f) selecting an alarm signalling mode;

(1) the alarm selecting step (f) wherein said signalling mode includes the step of selecting at least two alarm signals comprising an audible and visible alarm signal;

(2) the alarm selecting step (f) wherein said signalling mode includes selecting an auxiliary alarm indicator, wherein said indicator is a visible signal selected from a from a plurality of light indicating source colors;

(3) the alarm selecting step (f), further comprising the step of retrieving a user specific audio file in case of an emergency;

(g) selecting a manual operating mode, said mode includes the step of deactivating and disengaging a wheel motor means for free wheel rotation, and including the step of selecting a manual operating mode for a specific wheelchair configuration, said configuration includes at least;

(h) a distinct laying;

(i) sitting; and (j) standing configuration, wherein each of said configuration steps (h), (i) and (j) includes the step of inputing calibrated data, corresponding to distinct linear and annular displacement values for each respective configuration within a predetermined data range.

14. The method for calibrating the multi-feature automated wheelchair for a specific user according to claim 13, wherein the selecting step (g) further comprises the steps of:

(k) selectively engaging a brake for preventing wheel rotation; and (l) selectively disengaging a break for enabling wheel rotation.

15. The method for calibrating the multi-feature automated wheelchair for a specific user according to claim 13, wherein said step (b) for inputing user specific data includes at least input of a name, identification number, insurance carrier and, medical condition of the user.

16. The method for calibrating the multi-feature automated wheelchair for a specific user according to claim 13, wherein said step (d) for inputing emergency data includes the step of inputing a telephone contact number for contacting at least one of a health care professional, ambulatory station or police station in real time or via a pre-recorded emergency message, the step (d) further includes in alternative a data override step for operating the wheelchair without user input data.

* * * * *